(12) United States Patent
Khouw et al.

(10) Patent No.: US 6,221,318 B1
(45) Date of Patent: Apr. 24, 2001

(54) PROCESS AND APPARATUS FOR DISTRIBUTING FLUIDS IN A CONTAINER

(75) Inventors: Frank Hsian Hok Khouw; Geert van der Honing; Willem Machiel van Poelje, all of HR The Hague (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/230,173

(22) Filed: Apr. 20, 1994

(30) Foreign Application Priority Data

Apr. 21, 1993 (EP) .................................................. 93201162

(51) Int. Cl.[7] .......................................................... B01J 8/18

(52) U.S. Cl. ........................... 422/143; 422/139; 422/145; 422/181; 422/192; 422/218; 34/369; 406/155

(58) Field of Search .................................. 422/218, 192, 422/181, 143, 139, 145; 34/369, 582, 588; 406/155, 174

(56) References Cited

U.S. PATENT DOCUMENTS

| 2,608,474 | * | 8/1952 | Gilliam | 422/143 |
|---|---|---|---|---|
| 2,999,012 | | 9/1961 | McClure . | |
| 3,259,998 | * | 7/1966 | Leclere et al. | 34/585 |
| 3,912,460 | * | 10/1975 | McGann | 422/143 |
| 4,150,090 | | 4/1979 | Murphy et al. . | |
| 4,443,551 | * | 4/1984 | Lionetti et al. | 422/143 |
| 4,444,653 | * | 4/1984 | Euzen et al. | 422/143 X |
| 4,478,707 | * | 10/1984 | Bischoff et al. | 422/143 |
| 4,595,567 | | 6/1986 | Hedrick . | |
| 4,664,888 | | 5/1987 | Castagnos, Jr. . | |
| 5,156,817 | | 10/1992 | Luckenbach . | |
| 5,205,993 | * | 4/1993 | Leib et al. | 422/144 |

FOREIGN PATENT DOCUMENTS

| 1310886 | 3/1973 | (GB) . |
|---|---|---|
| 2069365 | 8/1981 | (GB) . |

* cited by examiner

Primary Examiner—Timothy McMahon

(57) ABSTRACT

Process for radial distribution of fluid into a fluid mass wherein fluid is radially conveyed within and isolated from the fluid mass and discharged via a plurality of distribution points located radially in the fluid mass.

8 Claims, 2 Drawing Sheets

PROCESS AND APPARATUS FOR DISTRIBUTING FLUIDS IN A CONTAINER

FIELD OF THE INVENTION

The present invention relates to a process and corresponding apparatus for introducing a stream of fluid into a fluid mass to rapidly attain uniform radial fluid distribution.

More particularly, the invention relates to a process for introducing fluidized catalytic cracking particles into a fluidized bed of catalyst particles in the regenerator or reactor of a fluid catalytic cracking reactor to rapidly attain uniform radial distribution of introduced catalyst, and to an apparatus therefor.

BACKGROUND OF THE INVENTION

Fluidized catalytic cracking processes operate by circulating catalyst particles continuously from a reactor in which a hydrocarbon feed is cracked to lower boiling products, during which cracking carbonaceous material is deposited on the catalyst, via a regenerator in which the carbonaceous material is combusted to restore the catalyst activity, and returning catalyst particles to the reactor. Temperature of combustion in the regenerator is locally dependent on the amount of carbonaceous material on the catalyst and the supply of combustion gas in a given region.

While operation with a single catalyst inlet opening at the regenerator side wall has for many years been satisfactory, the benefit to be obtained by improving radial distribution in conventional processes has become apparent. The benefits available with improved distribution of catalyst are particularly apparent for units comprising a regenerator vessel of increased diameter or in which regeneration is conducted at relatively high temperatures. Such is the case for example with the processing of residual feeds or where limited elevation space or specific operation mode require operation with a reduced regenerator fluid bed height, combined with a large bed diameter. A condition for optimum regeneration is that the time for radial mixing of catalyst be less than that for coke combustion. With relatively high regeneration temperatures and heavier feed processing the rate of coke combustion is increased, requiring decrease in radial mixing time. With increase in diameter of a fluid bed, catalyst distribution must be more effective to prevent corresponding increase in radial mixing time. Should this condition not be met, radial gradients of coke, combustion gas and temperature form within the bed leading to an increase in oxygen content of flue gas and afterburn and a decrease in coke burning capacity for a given air blower.

In U.S. Pat. No. 4,150,090 a device is disclosed comprising an axially located transport riser projecting from the lower part of a regenerator vessel and supporting a plurality of radially extending fluidized catalyst distributor troughs, located in downward sloping direction at the surface of a regenerator bed. Catalyst is transported and expelled along the length of the open-top troughs by means of fluidizing gas supplied via conduits running along the length of the troughs and having apertures along the length thereof.

In U.S. Pat. No. 5,156,817 devices are disclosed for supplying catalyst to one or a plurality of open-sided channels defined between a base and top member of, for instance, inverted v-shaped cross-section by which means catalyst is discharged along the length of the channel(s), the channel(s) being closed at their proximal end. A single channel forms an incomplete annulus in the regenerator bed. A plurality of channels are of different lengths and emanate in a fan formation from a supply conduit located towards the side of the bed, the longest channel extending to the axis of the regenerator bed.

These devices suffer from the disadvantage that with normal operation, catalyst discharge is uneven along the length of the channels or troughs, occurring to a lesser extent at the remote ends. Uniform discharge along the length of an open-sided channel would require excessive pressure drop which could be detrimental to the pressure balance of the unit. Provision of aeration conduits along distribution troughs incur high installation and maintenance costs. In all cases radial mixing is governed by interaction between the flow pattern in the channels or troughs and the fluidized bed, and is therefor sensitive to changes in flow rate in the distributor which may affect the quality of radial distribution.

We have now found that fluids introduction and subsequent mixing into a fluid mass can be attained in a simple and controllable manner which is moreover robust to changes in distributor fluid flow. This manner relies on discharging the fluid at specific points in the fluid mass while avoiding interaction between the bed and such points until the discharge point is reached. It has surprisingly been found that by this manner radial catalyst distribution gradients in the fluid mass are rapidly dissipated which would not have been expected. At the fluid discharge point the fluid kinetic energy may be locally eliminated after which the normal mixing action of the fluid mass promotes further radial mixing.

SUMMARY OF THE INVENTION

Accordingly, the present invention provides a process for radial distribution of fluid in a fluid mass wherein fluid is radially conveyed within and isolated from the fluid mass and discharged via a plurality of distribution points located radially in the fluid mass.

DETAILED DESCRIPTION OF THE PREFERRED EMBODIMENTS

A. OVERVIEW

Figure 1:
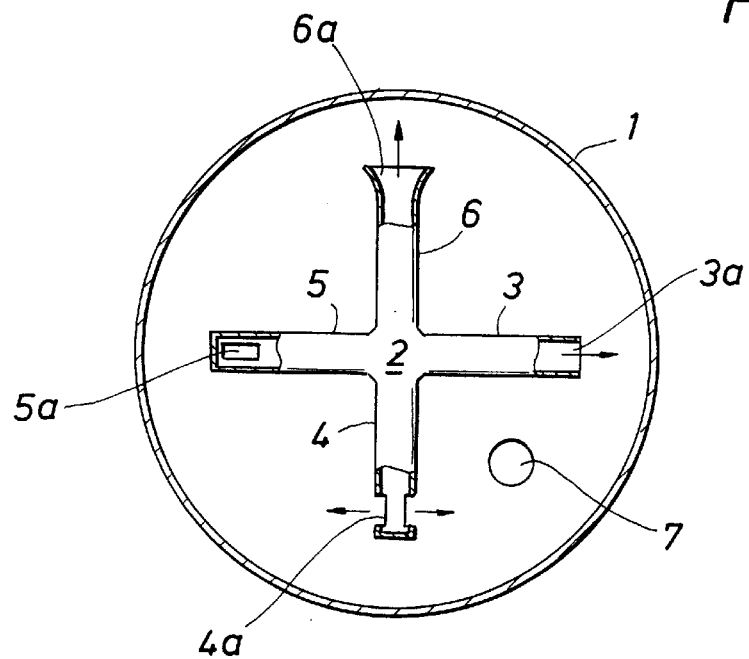
FIG. 1 is a plane view of a radial arm distributor located in a fluid mass containing vessel.

In a preferred embodiment of the process according to the invention fluid is discharged at a distance at least one quarter of the radius of the fluid mass from the fluid mass axis, more preferably at a distance of at least $4/10$ of the radius, for example substantially one half of the radius.

Preferably kinetic energy is dissipated by impact or expansion of the fluid to be distributed.

B. THE FLUID

The term "fluid" is herein used with reference to liquid, gas or to a mixture of fluidizing gas and finely divided solids maintained in a fluidized form by the fluidizing gas. Suitably the fluid comprises catalyst particles or combustible matter, such as fuel oil, shale oil or coke. Preferably the fluid comprises fluidized solids such as fluidized cracking catalyst particles. The term "fluid mass" is used herein with reference to the contents of a vessel into which fluid is discharged in accordance with the present invention. Such a vessel may be of any cross-sectional geometry, such as circular, square, and is preferably circular. Suitably a fluid mass is a fluid bed which may therefore be relatively large radial cross-sectional area into which solids may be introduced periodically or continuously and retained for a sufficient residence time to allow extended contact by a treating medium. Preferably the fluid bed comprises the reactor, stripper or regenerator bed of a fluid catalytic cracking unit into which catalytic cracking particles having entrained product gases or bearing carbonaceous deposits from cracking reactions are introduced for removal of product gases or combustion of deposits.

Suitably a fluid comprising finely divided solids particles is transported in lean or dense, preferably in lean phase.

C. RADIALLY

The term "radially" is used herein with reference to radii about the axis of the fluid mass or about a single fluid inlet location from which fluid is conveyed to distribution points.

D. DISTRIBUTION POINTS

The term "distribution point" is herein used with reference to a substantially localized distribution area, suitably 30 to 300% of the cross-section of a radially conveyed fluid stream.

E. APPARATUS

1. Overview

According to a further embodiment of the present invention there is provided an apparatus for radial distribution of fluid into a fluid mass comprising a centrally disposed fluid conduit where said fluid riser inlet conduit extends through a wall or floor of the vessel and is oriented substantially vertically along its longitudinal axis having a plurality of fluid conveying arms extending substantially horizontally outward from the vertical axis of the fluid riser inlet conduit and extending radially into the fluid mass characterized in that the arms have an enclosed length and one or more outlet openings at or near the end remote from the fluid conduit.

An apparatus according to the invention may additionally have an outlet opening located on the fluid conduit.

Suitably an apparatus according to the invention comprises fluid conveying arms of length of at least one quarter of the radius of the fluid mass.

An apparatus according to the invention may additionally comprise means at the outlet openings for dissipation of the kinetic energy of the fluid to be distributed.

Preferably means for dissipating the fluid kinetic energy are impact or expansion means. The term "impact means" is herein used with reference to means provided in cooperation with the outlet opening whereby the fluid exiting the outlet opening impacts thereon, and is for example an impact face located in the fluid stream path. Examples of impact means include splash plates and impact baffles which provide an impact face or faces to the distributed fluid. The term "expansion means" is herein used with reference to means for expanding the fluid volume, for example fluid conveying arms of increasing cross-sectional area in radial direction or fluid-permeable packing provided at or downstream of the distribution point. Guide means such as ridges or channels may be provided on the fluid conveying arm walls to assist in expansion of the fluid stream.

2. Impact Means

Suitably impact means are supported on the fluid conveying arm or on the regenerator wall. Splash plates and impact baffles are arranged at such an angle to the fluids stream that an impact surface is presented to the fluids stream thereby dissipating the stream flow momentum and kinetic energy.

Suitable angle of impact surface to fluid stream flow direction depends on the density and velocity of the stream. In particular, impact means may be arranged at an angle of 90 to 165 degrees to the stream flow.

Impact means may be mono or multiplanar or may be of pyramidal configuration or even comprise a curved face or faces providing a gradually lessening degree of impact. Faces of a multiplanar impact means are directed away from each other.

3. Fluid Conveying Arm

Fluid may be distributed from an opening towards the end of a fluid conveying arm, for example in the base or side thereof whereby the arm has a closed remote end, or from an opening in the remote end wall of a fluid conveying arm whereby it is clear that the arm is enclosed along the complete length.

In a particularly preferred embodiment of the invention a fluid conveying arm has an opening towards the end and in the base or side thereof. Optionally a splash plate is located beneath an opening in the base. This apparatus provides particularly good fluid dispersion. It is of particular advantage for distribution of fluidized catalyst in the lower part of a catalyst bed of a catalytic cracking catalyst regenerator that a splash plate prevents catalyst penetrating to the lower part of the bed and causing erosion of fluidizing internals by impact thereon.

4. Expansion Means

Suitably expansion means comprise known fluid expander configurations located at i.e., fixedly attached to, or integral with the outlet of the fluid conveying arms. Hence an arm configuration providing an increasing cross sectional area in radial direction may be envisaged. The arm outlets may be somewhat horizontally elongate in cross section to limit the vertical dispersion of fluid. Expansion may also be achieved by means of structured fluid-permeable packing located at a fluid distribution point.

The supply conduit may be wholly or partially located in the fluid mass. Preferably the supply conduit is substantially vertically arranged in the fluid mass and is more preferably a riser conduit. Preferably the conduit is located substantially coaxially with the fluid mass but may be acentrically located in such a manner that the distributor arm outlets are regularly arranged in the fluid mass to ensure radial uniformity of outlet. A supply conduit which is located partially within the fluid mass suitably projects axially within a fluid containing vessel through the base thereof and is supplied by an external fluid conveying standpipe. A supply conduit which is located wholly within the fluid mass may be supplied by a fluid conveying standpipe which suitably projects within the fluid vessel via its sidewall to the lower part of the fluid bed. In an alternative embodiment the conduit may be fed by a coaxially surrounding downer entering the fluid containing vessel above the surface of the fluid mass.

5. Transport

For use with fluidized solids transport fluidizing gas is suitably introduced at the base of the supply conduit. Preferred transport gases are inert such as steam or air. Transport gas superficial velocity is sufficient to lift the solids in the riser, without causing flow segregation. Suitably gas superficial velocity for transporting fluidized cracking catalyst is 1 to 25 m/s, preferably 3 to 12 m/s. By control of the supply of the fluidizing gas and of the solids, the fluidized solids flow in the riser is controlled. Suitably the riser solids flux is maintained in the range of 200 to 3000, preferably in the range of 600 to 1500 kg/m2/s.

The apparatus of the invention comprise a plurality of fluid conveying arms extending radially into the fluid mass. It will be understood that arms may extend substantially in a radius in a cross-sectional plane of the fluid mass, or may be at an angle to the cross-sectional plane, suitably at an angle of up to 60 degrees. Preferably the number of arms is suited to give optimum distribution for an acceptable mechanical burden on the device. Preferably the device of the invention comprises 2 to 10 arms, more preferably 3 to 8, for example 4 arms. The arms may be of the same or different length and are preferably of the same length. Arms may be any desired shape in cross-section but preference is given to continuous non-angular cross-sectional profiles.

For use with fluidized solids, control of fluids stream velocity in the fluid conveying arms minimizes deposit of solids from the stream. Suitably, fluids stream velocity in the arms is maintained above a suitable minimum velocity, suitably greater than 3 m/s, preferably greater than 6 m/s.

6. Supply Conduit

Suitably the fluids supply conduit comprises at its head a junction from which the fluid conveying arms radially extend. In a preferred embodiment of the device of the invention an axial riser conduit comprises a device to uniformly divide the solids flow into the arms. Suitable devices include known riser top geometries, for example a blinded T-bend optionally in combination with guide vanes. Most preferred is a device comprising an inverted cone wherein the solids flow impinges centrally on the apex of the cone and is radially diverted with equal distribution into the distributor arms. Suitably internal guide vanes project from the cone into the junction area for improved flow dispersion. This latter device has the advantage that pressure drop, resulting from change of solids stream directional momentum is considerably reduced, thereby reducing attrition of fluidized solids and erosion of the distributor device.

DETAILED DESCRIPTION OF THE DRAWINGS

The invention will now be illustrated by means of non-limiting example with reference to FIGS. 1 to 5.

A fluids distribution apparatus as shown in plane view FIG. 1 is preferably located in a fluid mass containing vessel (1) of circular cross-section. The distributor apparatus comprises a junction (2) of a supply conduit (not shown) for introduction of fluid into the vessel, from which fluid conveying arms (3,4,5,6) emanate in radial direction. In this embodiment four arms are shown, each illustrating one of alternative embodiments of arm outlet opening configurations. Arm (3) is open at the remote end (3a), allowing fluid outlet through the open end. Arm (4) comprises opening outlets (4a) in the side walls thereof at the remote end. Arm (5) comprises an outlet opening (5a) in the base thereof. Arm (6) is of increased cross-sectional area at the remote end, allowing fluid outlet through the open end (6a). Impact means which are optionally associated with outlet openings of arms (3,4,5,6) are not shown. Fluid conveying arm (6) provides means for expansion of the fluid stream in the form of the increased cross-section arm end (6a). A fluid withdrawal opening in the base of the vessel is shown (7) for removal of fluid from the vessel (1). The opening is preferably located at the site of least disturbance of distributed fluid.

A. FIG. 1

The process according to the present invention using the fluids distribution apparatus shown in FIG. 1 is normally carried out as follows. Fluid is introduced into the fluid containing vessel via an enclosed conduit and is divided into streams at junction (2), for radial transport within but isolated from the fluid mass to distribution points of which four alternative embodiments are illustrated (3a, 4a, 5a, 6a). Fluid outlet at the distribution points is shown by respective arrows (arrow not shown on arm (5)). Once discharged the fluid comes into contact with the fluid mass and is further distributed by the action of the mass. Radially uniform distribution of incoming fluid has been found to occur by transporting fluid to discrete distribution points prior to contacting with fluid mass. Disruption of radial distribution by withdrawal of fluid from the vessel (1) is minimized by careful location of the withdrawal opening (7).

B. FIG. 2

Figure 2:
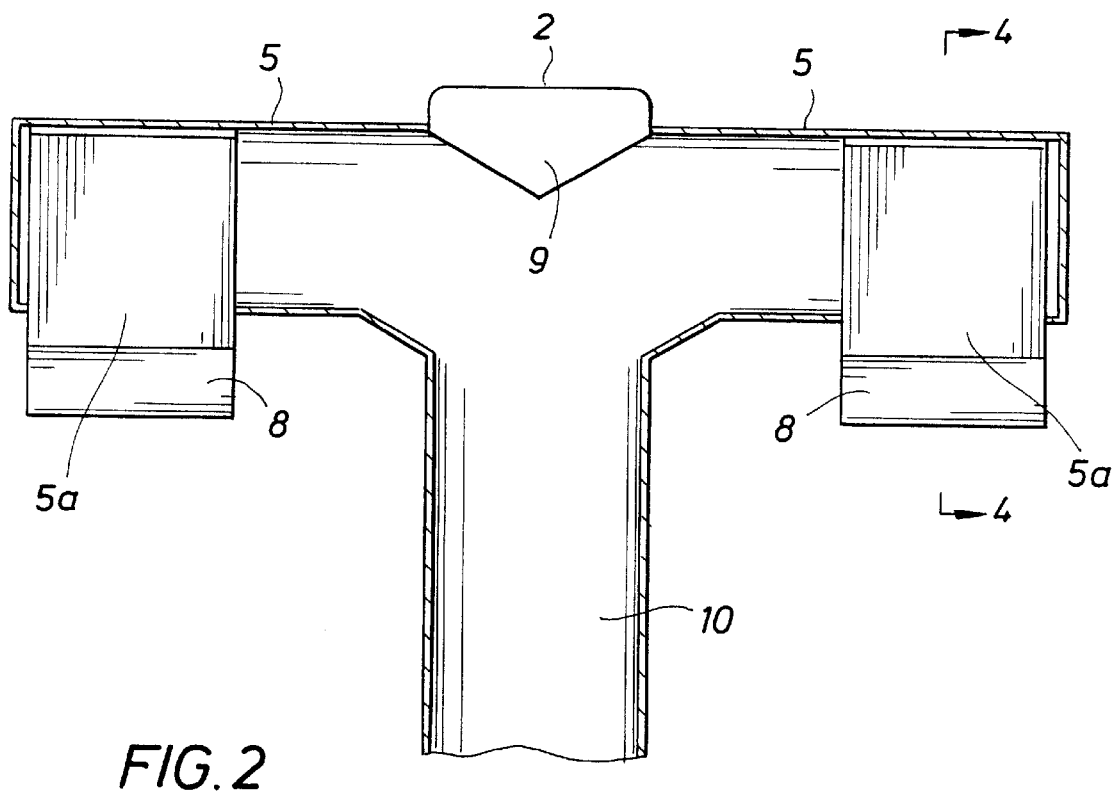
FIG. 2 is a lengthwise cross-sectional view of a fluid distributor apparatus having splash plates located below the arms (two shown)

A fluids distribution apparatus shown in FIG. 2 comprises a riser inlet conduit (10) having at its head a junction (2) from which a plurality of arms (5) of which two are shown, emanate radially. Arms (5) comprise fluids outlet opening (5a) in the base thereof, in which opening a splash plate (8) is supported for improved radial fluid dispersion. Junction (2) includes an inverted cone (9) having internal guide vanes (not shown) for division of the fluids stream among the fluid conveying arms.

The process according to the present invention using the fluids distribution apparatus shown in FIG. 2 is normally carried out as follows. Fluid is introduced into the fluid containing vessel via enclosed conduit (10) and is separated at the conduit head by junction (2) and conveyed to fluid distribution points (5a) via enclosed fluid conveying arms (5). Fluid is discharged at distribution points (5a) and impacts on splash plates (8) with dissipation of fluid kinetic energy thereby allowing distribution by interaction with the fluid mass. Dune formation and erosion are minimized by provision of sloping arm mouth sections adjacent the riser.

C. FIG. 3

Figure 3:
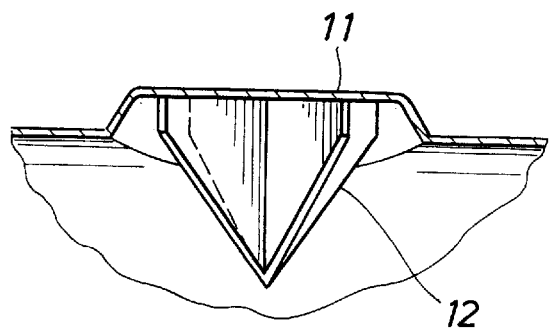
FIG. 3 is a view of a riser head junction with guide vanes.

An inverted cone fluids stream divider is shown in FIG. 3 comprising a cap (11) with four guide vanes (12) located such that each space between the guide vanes is associated with the mouth of a fluid conveying arm.

D. FIG. 4

Figure 4:
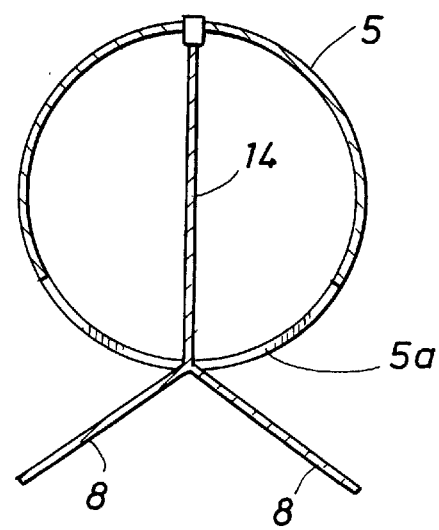
FIG. 4 is a cross-section along line X—X of FIG. 2 showing the baffle mounting.

The fluid conveying arm outlet opening of FIG. 2 as shown in FIG. 4 comprises a single opening (5a) in the base of the arm through which opening a splash plate having two impact faces (8) is suspended from a support member (14).

Figure 5:
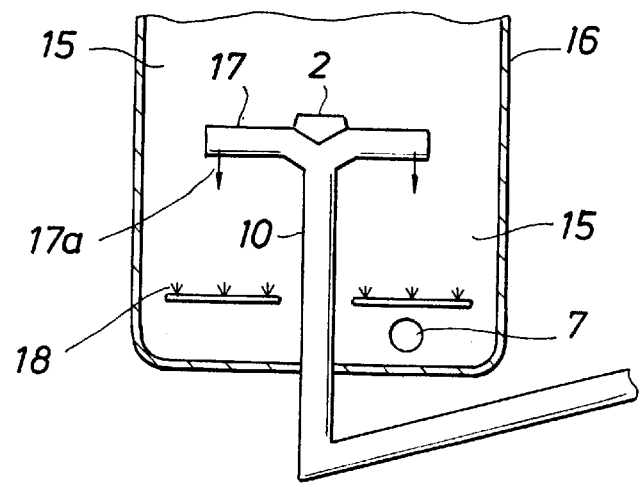
FIG. 5 is a side section of a regenerator vessel of a fluid catalytic cracking unit comprising a catalyst distributor apparatus according to the invention.

The regeneration vessel of a fluid catalytic cracking unit shown in FIG. 5 comprises a cylindrical vessel (16) provided with a riser inlet conduit (10) for introduction of fluid catalytic cracking catalyst into the fluidized catalyst bed (15). Fluidizing gas is introduced at the base of conduit (10). The inlet conduit comprises a fluidized catalyst distributor device at junction (2) having fluid conveying arms (17) with outlet openings (17a). A catalyst withdrawal opening (7) is shown in the base of the vessel. Fluidization nozzles are shown (18) for maintaining the catalyst bed in fluidized state.

E. FIG. 5

The process according to the present invention, for example using the fluidized catalyst distribution apparatus shown in FIG. 5, is normally carried out as follows. Fluidized catalytic cracking catalyst is introduced into the regenerator vessel (16) via riser inlet conduit (10) and transported by means of fluidizing gas introduced (not shown) at the base of the riser, to junction (2). Catalyst is transported along catalyst conveying arms (17) to distribution points (17a)

located within the fluidized catalyst bed. Catalyst is rapidly radially distributed. The catalyst bed is maintained in fluidized state by means of gas introduced via nozzles (18) by which further catalyst distribution is obtained by means of the energy of the fluid present in the catalyst bed.

What is claimed is:

1. An apparatus for radial distribution of fluid into a fluid mass contained in a vessel comprising (a) a vessel containing a fluid mass; (b) disposed within said vessel and within said fluid mass, a centrally disposed fluid riser inlet conduit extending through a wall or floor of said vessel and oriented substantially vertically along the fluid riser inlet conduit's longitudinal axis, said riser inlet conduit having a plurality of fluid conveying arms each of said arms having an end remote from said fluid riser inlet conduit, and each of said arms extending radially and substantially horizontally outward from the vertical axis of said fluid riser inlet conduit and extending radially into the fluid mass wherein the arms have an enclosed length and (c) having along said enclosed length one or more outlet openings at or near the end remote from the fluid riser inlet conduit.

2. The apparatus according to claim 1 wherein said fluid conveying arms have a length of at least one quarter of the radius of the fluid mass.

3. The apparatus according to claim 1 further comprising means for dissipating kinetic energy of the fluid as the fluid is discharged at each outlet opening.

4. The apparatus according to claim 3 wherein said kinetic energy dissipating means comprises impact or expansion means.

5. The apparatus according to claim 4 wherein said impact means include splash plates or impact baffles wherein said splash plates or impact baffles are integral to or fixedly attached to said fluid conveying arms.

6. The apparatus according to claim 4 wherein said expansion means include fluid conveying arms of increasing cross-sectional area in radial direction or fluid-permeable packing.

7. The apparatus according to claim 4 wherein the fluid conveying arms have an outlet opening in the base or side thereof whereby the arm has a closed remote end.

8. The apparatus according to claim 4 wherein the kinetic energy dissipating means consists essentially of expansion means and wherein the fluid conveying arms are enclosed along their complete length and have an outlet opening in the remote end wall.

* * * * *